United States Patent
Takatsuka et al.

(10) Patent No.: US 9,152,229 B2
(45) Date of Patent: Oct. 6, 2015

(54) DISPLAY PROCESSING DEVICE, DISPLAY PROCESSING METHOD, DISPLAY PROCESSING PROGRAM, AND MOBILE TERMINAL DEVICE

(75) Inventors: Susumu Takatsuka, Tokyo (JP); Akihiro Ishida, Tokyo (JP); Hideaki Imai, Kanagawa (JP); Itoko Hanami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 874 days.

(21) Appl. No.: 12/433,308

(22) Filed: Apr. 30, 2009

(65) Prior Publication Data

US 2009/0295832 A1    Dec. 3, 2009

(30) Foreign Application Priority Data

Jun. 2, 2008 (JP) ................................. 2008-145044

(51) Int. Cl.
*G06T 3/40* (2006.01)
*G06F 3/01* (2006.01)

(52) U.S. Cl.
CPC .. *G06F 3/012* (2013.01); *G06T 3/40* (2013.01)

(58) Field of Classification Search
USPC ................................. 345/619, 156; 348/208.5
See application file for complete search history.

(56) References Cited

U.S. PATENT DOCUMENTS

| | | | |
|---|---|---|---|
| 6,215,471 B1 * | 4/2001 | DeLuca | 345/158 |
| 6,864,912 B1 * | 3/2005 | Mahaffey et al. | 348/61 |
| 2004/0240708 A1 * | 12/2004 | Hu et al. | 382/103 |
| 2005/0104848 A1 * | 5/2005 | Yamaguchi et al. | 345/156 |
| 2006/0126894 A1 * | 6/2006 | Mori | 382/103 |
| 2006/0139463 A1 * | 6/2006 | Heinonen | 348/239 |
| 2007/0019000 A1 * | 1/2007 | Motomura et al. | 345/619 |
| 2007/0057068 A1 | 3/2007 | Tsai | |
| 2007/0097151 A1 * | 5/2007 | Rosenberg | 345/660 |
| 2007/0113099 A1 * | 5/2007 | Takikawa et al. | 713/186 |

(Continued)

FOREIGN PATENT DOCUMENTS

| | | |
|---|---|---|
| EP | 1 408 399 A2 | 4/2004 |
| EP | 1 770 487 A2 | 4/2007 |

(Continued)

OTHER PUBLICATIONS

Office Action issued Dec. 11, 2012 in Japanese Application No. 2008-145044.

(Continued)

*Primary Examiner* — Phi Hoang
(74) *Attorney, Agent, or Firm* — Oblon, McClelland, Maier & Neustadt, L.L.P.

(57) ABSTRACT

A display processing device includes a face image detecting unit detecting the user's face image based on imaging data output from a camera unit provided on a cabinet, a position/angle change detecting unit detecting a change in the position of the user's face image and a change in the face angle, and a display control unit that displays a predetermined image on a display unit, moves the position of the display image in accordance with a change in the position of the detected user's face image, the change occurring in the X-axis direction and the Y-axis direction, performs enlargement/reduction processing based on a position change in the Z-axis direction, performs rotating processing in accordance with a change in the face angle so that an image viewed from the face angle is obtained, and displays the obtained image on the display unit.

6 Claims, 9 Drawing Sheets

(56) References Cited

U.S. PATENT DOCUMENTS

| | | | |
|---|---|---|---|
| 2007/0248281 A1* | 10/2007 | Super et al. | 382/275 |
| 2008/0111889 A1* | 5/2008 | Fujita et al. | 348/208.5 |
| 2008/0124005 A1* | 5/2008 | Lin et al. | 382/313 |
| 2008/0246852 A1* | 10/2008 | Mori | 348/222.1 |
| 2010/0171691 A1* | 7/2010 | Cook et al. | 345/156 |

FOREIGN PATENT DOCUMENTS

| | | |
|---|---|---|
| JP | 7-181939 | 7/1995 |
| JP | 2001-319217 | 11/2001 |
| JP | 2003-179686 | 6/2003 |
| JP | 2003-195145 | 7/2003 |
| JP | 2004-318603 | 11/2004 |
| JP | 2005-318515 | 11/2005 |
| JP | 2007-14068 | 1/2007 |
| JP | 2007-95030 | 4/2007 |
| JP | 2007-324893 | 12/2007 |

OTHER PUBLICATIONS

Japanese Office Action issued Mar. 19, 2013, in Japan Patent Application No. 2008-145044.

* cited by examiner

USER'S FACE IMAGE PICKED UP
THROUGH FRONT CAMERA UNIT

ROTATED IN LEFT DIRECTION

STANDBY IMAGE DISPLAYED
ON DISPLAY UNIT
(ROTATED IN RIGHT DIRECTION)

FIG. 7B

USER'S FACE IMAGE PICKED UP
THROUGH FRONT CAMERA UNIT

ROTATED IN DOWNWARD DIRECTION

STANDBY IMAGE DISPLAYED
ON DISPLAY UNIT
(ROTATED IN DOWNWARD DIRECTION)

ROTATED IN DOWNWARD DIRECTION

FIG. 7C

USER'S FACE IMAGE PICKED UP
THROUGH FRONT CAMERA UNIT

ROTATED IN UPPER LEFT SLANTING DIRECTION

STANDBY IMAGE DISPLAYED
ON DISPLAY UNIT
(ROTATED IN UPPER RIGHT SLANTING DIRECTION)

FIG. 9

DISPLAY PROCESSING DEVICE, DISPLAY PROCESSING METHOD, DISPLAY PROCESSING PROGRAM, AND MOBILE TERMINAL DEVICE

BACKGROUND OF THE INVENTION

1. Field of the Invention

The present invention relates to a display processing device, a display processing method, a display processing program, and a mobile terminal device that can be used for a terminal device provided with a camera function, where the terminal device includes, for example, a mobile phone, a personal handyphone system (PHS) phone, a personal digital assistant (PDA) device, a mobile game machine, a note-type and/or desktop-type personal computer apparatus, and so forth, and particularly relates to a display processing device, a display processing method, a display processing program, and a mobile terminal device that detect, for example, a change in the orientation and/or the position of the user's face based on the image of the user's face, the image being picked up through a camera unit, and perform the display processing corresponding to the detection result in real time, the display processing including, for example, changing the display direction and/or the display size of an image displayed on a display unit.

2. Description of the Related Art

Japanese Unexamined Patent Application Publication No. 7-181939 discloses a display device which automatically enlarges part of a display screen image and/or displays the entire image by detecting actions unintentionally performed by a person without mechanically operating a mouse or the like.

According to the above-described display device, the distance between a user and a liquid crystal display is measured through a sensor. When the measured value indicates that the distance between the user and the liquid crystal display is large, image data stored in a memory is displayed on the liquid crystal display as a reduced image. If the measured value indicates that the distance is small, the image data stored in the memory is displayed on the liquid crystal display as an enlarged image.

SUMMARY OF THE INVENTION

However, the display device disclosed in Japanese Unexamined Patent Application Publication No. 7-181939 is provided with a sensor specifically designed to measure the distance between the user and the liquid crystal display. Therefore, the display device itself may become a large-scale device.

Accordingly, the present invention provides a display processing device, a display processing method, a display processing program, and a mobile terminal device that can change the display direction and/or the display size of an image displayed on a display unit based on a change in the position and/or the angle of the user's face and display the image through a small-scale configuration without using a specifically designed sensor.

Therefore, a display processing device according to an embodiment of the present invention includes a face image detecting unit configured to detect an image of a user's face based on imaging output data transmitted from a camera unit provided on a cabinet, a position/angle change detecting unit configured to detect a change in the position of the user's face image detected through the face image detecting unit and a change in a face angle of the user's face image detected through the face image detecting unit, and a display control unit configured to display a predetermined display image on a display unit, perform moving processing for the display position of the display image displayed on the display unit in accordance with a change in the position of the user's face image detected through the position/angle change detecting unit, the change occurring in the X-axis direction and the Y-axis direction, perform enlargement/reduction processing based on a change in the position in the Z-axis direction, perform rotating processing in accordance with a change in the face angle of the user's face image so that a display image viewed from the face angle is obtained, and display the obtained display image on the display unit.

According to an embodiment of the present invention, the image of a user's face is detected based on picked-up data output from a camera unit provided on a cabinet. Further, moving processing is performed for the display position of the face image based on a change in the position of the detected user's face image in the X-axis direction and the Y-axis direction, and the face image is displayed on the display unit. Further, enlargement/reduction processing is performed based on a change in the position in the Z-axis direction, and rotating processing is performed for the face image based on a change in the angle of the user's face image so that a display image viewed from the above-described face angle is obtained, and the display image is displayed on the above-described display unit.

According to an embodiment of the present invention, the image of a user's face, the image being picked up through a camera unit provided on a cabinet, is analyzed so that a change in the position and/or the angle of the user's face is detected. Further, the display direction and/or the display size of an image displayed on a display unit can be changed based on the detected change in the position and/or the angle of the user's face, and the face image can be displayed. The use of the camera unit provided on the cabinet allows for implementing the above-described processing through a small-scale configuration without using a specifically designed sensor.

DESCRIPTION OF THE PREFERRED EMBODIMENTS

The present invention can be used for a mobile phone.

[Electrical Configuration of Mobile Phone]

Figure 1:
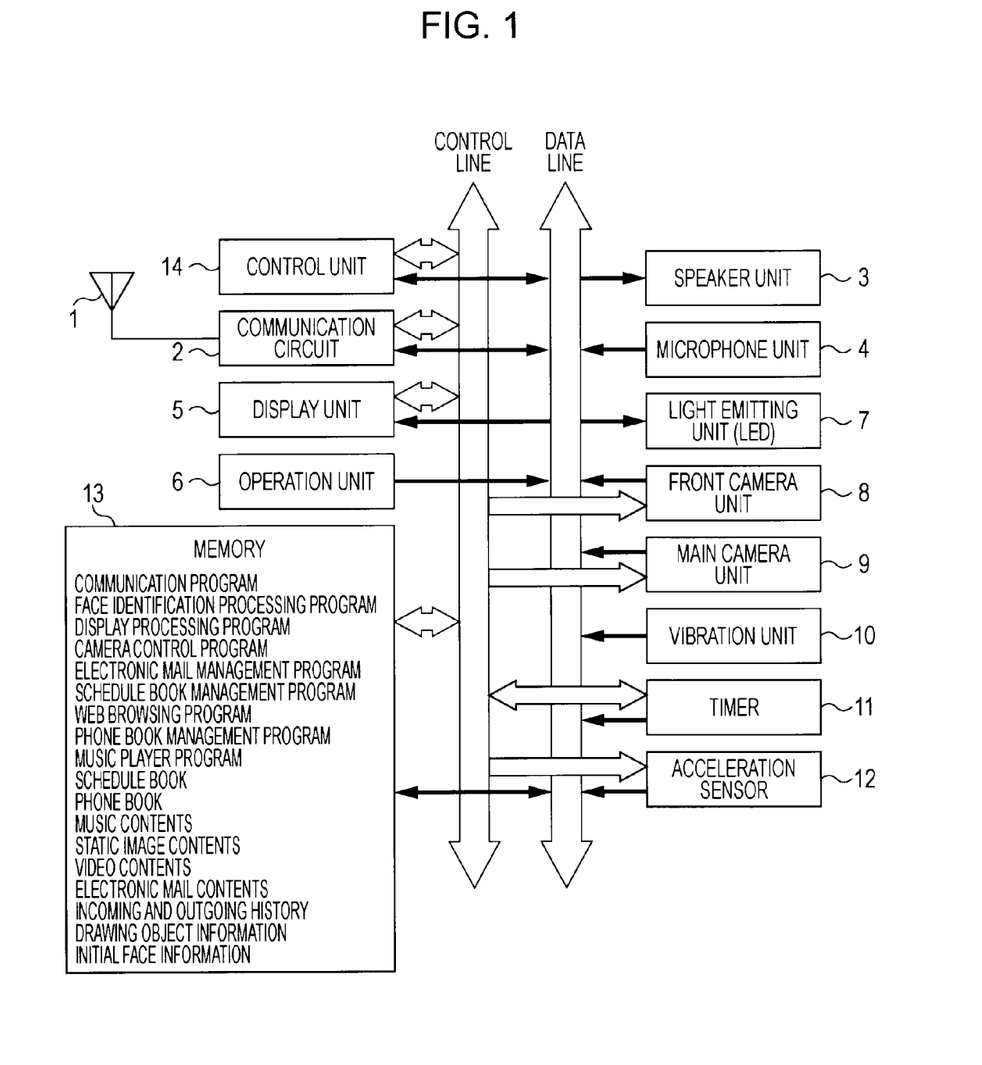
FIG. 1 is a block diagram of a mobile phone according to an embodiment of the present invention.

First, FIG. 1 shows a block diagram of a mobile phone according to an embodiment of the present invention. As shown in FIG. 1, the above-described mobile phone includes an antenna 1 and a communication circuit 2 that perform wireless communications between a base station and the mobile phone, the wireless communications including voice conversations, TV-phone conversations, transmission of electronic mails, world wide web (Web) data, and so forth, a speaker unit 3 configured to transmit data of received voice data or the like, a microphone unit 4 configured to collect, for example, voice data for transmission, a display unit 5 configured to display operation menus, electronic mails, images (still images and video), and so forth, an operation unit 6 provided with a plurality of operation keys including a cross key, an enter key, numerical keys, and so forth, and a light emitting diode (LED) unit 7 configured to notify a user of, for example, an incoming call and/or an outgoing call with light.

Further, the above-described mobile phone includes a so-called self-photographing front camera unit 8 provided for picking up the still image and/or the video of, for example, the user of the mobile phone, a main camera unit 9 configured to pick up the still image and/or the video of an appropriate subject, a vibration unit 10 configured to notify the user of, for example, an incoming call and/or an outgoing call by vibrating the cabinet of the mobile phone, a timer 11 configured to count time, and a so-called three-axis acceleration sensor 12 configured to detect the acceleration in three axis directions, that is, the X-axis direction, the Y-axis direction, and the Z-axis direction.

Further, the above-described mobile phone includes a memory 13 storing a communication program and/or various types of application programs provided to perform wireless communication processing via the above-described base station, and various types of data items (contents) or the like handled by the above-described application programs, and a control unit 14 configured to control operations of the entire mobile phone.

In addition to the above-described communication program, the memory 13 stores a face identification processing program provided to perform identification processing for the user's face image shown in images picked up mainly by the front camera unit 8, a display processing program provided to change the display direction and/or the display size of an image displayed on the display unit 5 in accordance with a change in the position of the user's face identified based on the face identification processing program and display the image, and a camera control program that controls imaging performed by the front camera unit 8 and/or the main camera unit 9 and that has a viewer function for picked up still images and/or video.

Further, the memory 13 stores an electronic-mail management program provided to control generation and/or transmission and reception of an electronic mail, a schedule-book management program provided to manage schedule book data with which the user's schedule is registered, a Web browsing program provided to browse a Web page disclosed on a server device provided on a predetermined network including a communication network, the Internet, and so forth, a phone-book management program provided to manage phone book data, and a music player program provided to reproduce music contents.

Further, the memory 13 stores schedule book data with which schedule data predetermined by the user is registered, phone book data with which user name data including data of the names of an acquaintance, a friend, and so forth of the user, data of still images (the photographs of faces, etc.), data of addresses, data of phone numbers, data of electronic-mail addresses, date-of-birth data, and so forth are registered, music contents reproduced based on the music player program, still image contents and video contents that are reproduced based on the viewer function of the camera control program, electronic mail contents that are transmitted and received, and data of the incoming and outgoing history of phone calls and electronic mails, and so forth.

[External Configuration of Mobile Phone]

Figure 2A:
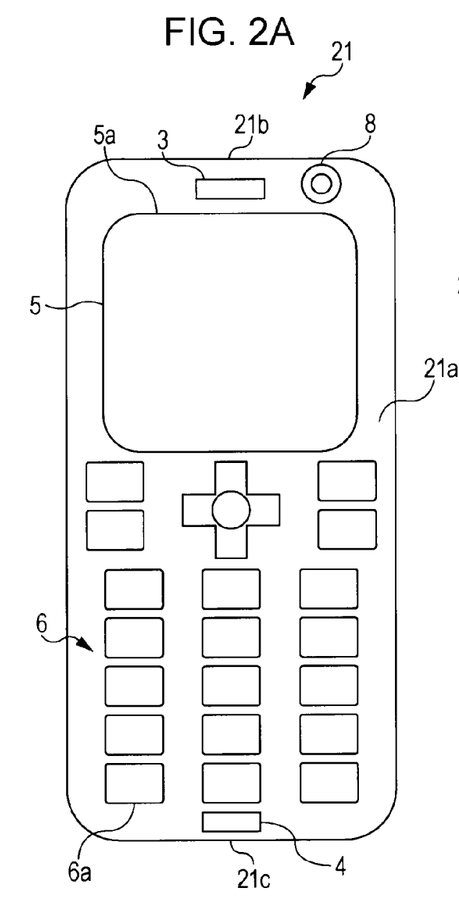
FIG. 2A shows an external view of the above-described mobile phone.
Figure 2B:
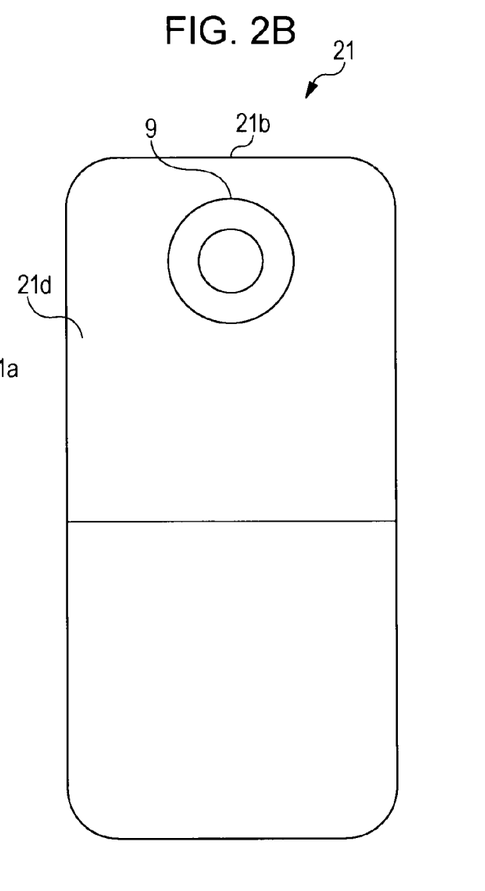
FIG. 2B shows another external view of the above-described mobile phone.

FIGS. 2A and 2B are the front view and the rear view of the above-described mobile phone. As shown in FIGS. 2A and 2B, the above-described mobile phone has a so-called straight (stick) shape, for example.

As shown in FIG. 2A, the above-described display unit 5 is provided on the area approximately corresponding to the upper half of a front face part 21a of a cabinet 21, and the above-described operation unit 6 is provided on the area approximately corresponding to the lower half of the front face part 21a. On the front face part 21a, the above-described speaker unit 3 configured to output received voice data and the above-described self-photographing front camera unit 8 are provided between an upper end part 5a of the display unit 5 and an upper end part 21b of the cabinet 21.

Further, the above-described microphone unit 4 used to collect, for example, voice data for transmission is provided between a lower end part 6a of the operation unit 6 and a lower end part 21c of the cabinet 21. Further, as shown in FIG. 2B, the main camera unit 9 used to pick up the image of a predetermined subject is provided on a rear face part 21d of the cabinet 21 at a position near the upper end part 21b of the cabinet 21.

[Display Processing Operations Performed for Display Image Data based on Front Camera Image]

Figure 3:
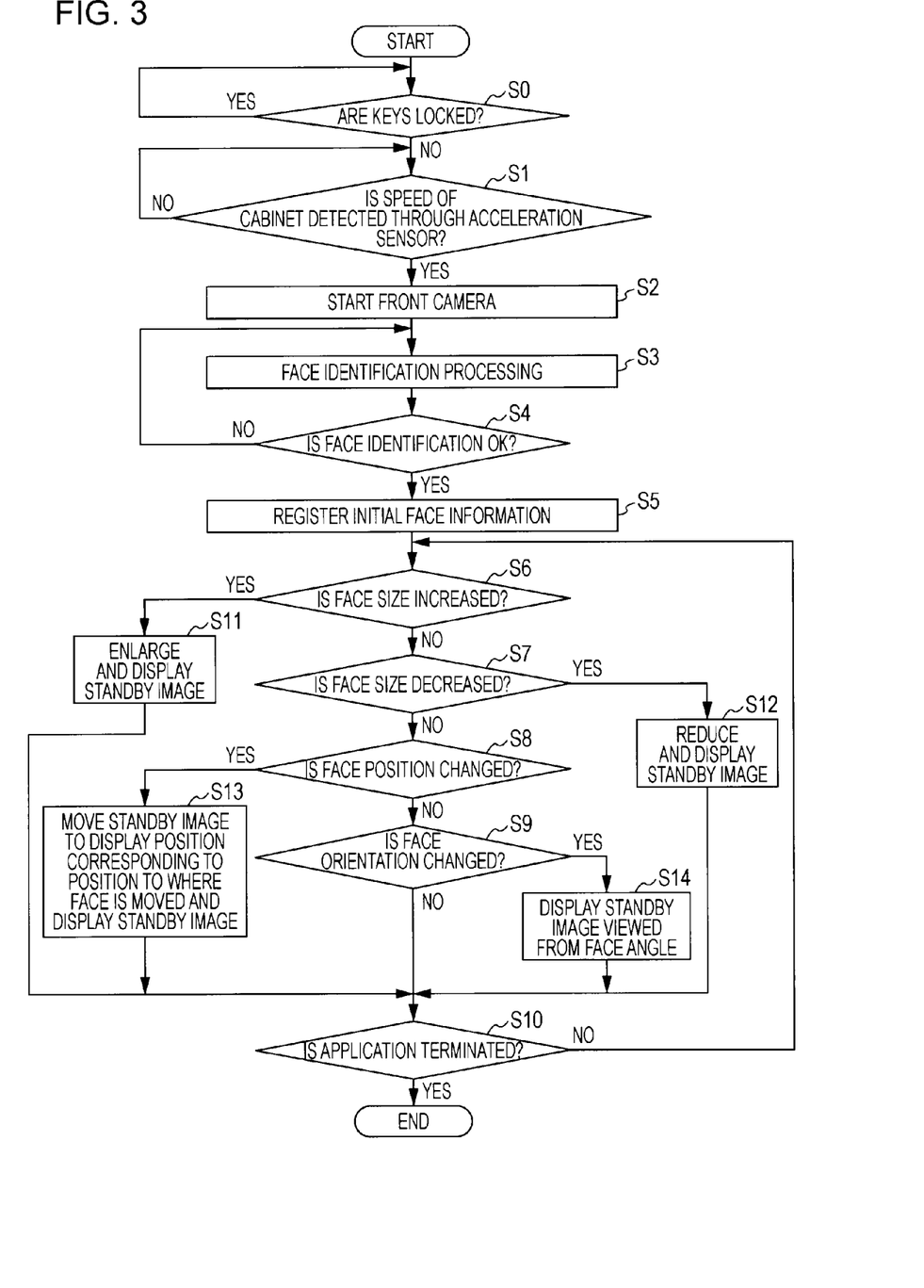
FIG. 3 is a flowchart showing the flow of display processing operations performed in the above-described mobile phone for a display image based on a front camera image.

The above-described mobile phone changes the display direction and/or the display size of an image displayed on the display unit 5 in accordance with a change in the position and/or the angle of the user's face image picked up through the front camera unit 8, and displays the image. FIG. 3 is a flowchart showing the flow of display processing operations performed to change the display direction and/or the display size of a standby image displayed on the display unit 5 in accordance with a change in the position and/or the angle of the user's face.

First, the control unit 14 functions as a display control unit based on the display processing program stored in the memory 13 so as to read drawing object information including the polygon data, data of vertex coordinates, data of the vertex colors, and data of the texture coordinates of an object for drawing, texture data placed on the polygon surface, various kind of information about the intensity, direction, and so forth of light applied to the object from the memory 13. Then, the control unit 14 performs drawing processing for data of a standby image provided as a predetermined three-dimensional image based on the drawing object information and displays the standby image on the display unit 5 so that processing procedures shown in the flowchart of FIG. 3 are started.

At step S0, the control unit 14 determines whether the keys are presently locked by the user (determines whether the key lock function is turned on/off). If it is determined that the key lock function is turned off, the control unit 14 advances the processing to step S1.

Namely, when a key-lock button provided on, for example, a side face part of the cabinet of the above-described mobile phone is operated, operations performed for part of and/or the entire keys provided on the mobile phone are cancelled, that is to say, the key lock function is turned on. Therefore, at step S0, the control unit 14 determines whether the key lock function is turned on/off before performing processing procedures described below. Then, if it is determined that the key lock function is turned off, the control unit 14 advances the processing to step S1.

Next, at step S1, the control unit 14 determines whether the cabinet 21 of the mobile phone is moved by monitoring sensor data output from the acceleration sensor 12 shown in FIG. 1. Then, the control unit 14 advances the processing to step S2 so as to start the front camera unit 8 at the time when the movement of the cabinet 21 is detected.

Namely, while waiting for an incoming phone call and/or an incoming electronic mail transmitted through a mobile phone, the user often places the mobile phone on a desk, a charger, and so forth. In that case, the mobile phone enters a standstill state. If the front camera unit 8 is started to perform the display processing for a display image based on a front camera image which will be described later during the standstill state, power is wasted.

Figure 4:
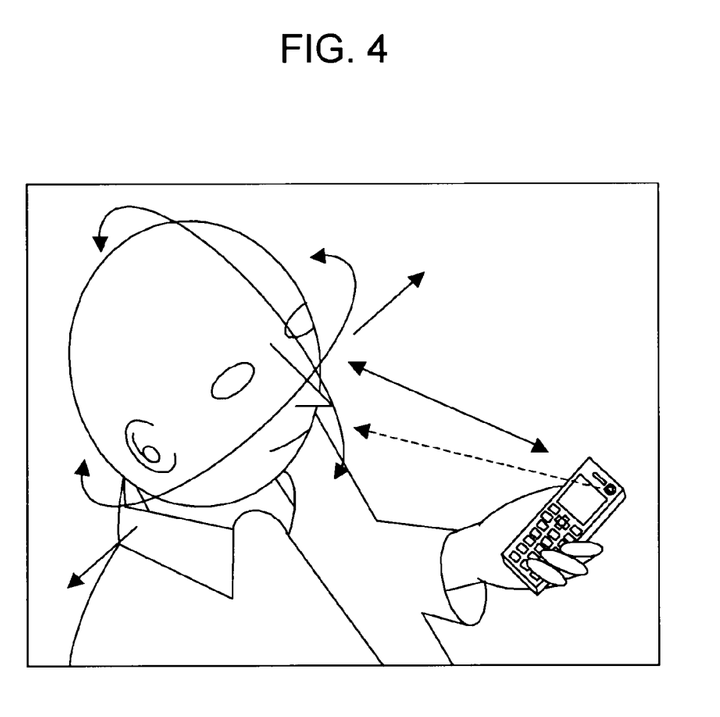
FIG. 4 is a schematic diagram indicating an example use of the above-described mobile phone.

Further, when performing the display processing for a display image based on the front camera image which will be described later, the user holds and lifts the mobile phone with his hand so that the image of his face is picked up through the front camera unit 8, as shown in FIG. 4. Consequently, the movement of the cabinet 21 occurs. Therefore, at step S1, the control unit 14 determines whether the cabinet movement occurs due the user holding and lifting the mobile phone with his hand based on sensor data output from the acceleration sensor 12. If the cabinet movement is detected, the front camera unit 8 is started at step S2. Accordingly, it becomes possible to prevent the front camera unit 8 from being started when the mobile phone is in the standstill state so that power is prevented from being wasted.

Further, the control unit 14 monitors sensor data output from the acceleration sensor 12 intermittently and/or continuously even though the front camera unit 8 had been started. Then, when sensor data items output from the acceleration sensor 12, the sensor data indicating that the cabinet 21 of the mobile phone is in the standstill state, are detected continuously over a predetermined time period, control is performed so that the front camera unit 8 which had been started is stopped.

When the sensor data items output from the acceleration sensor 12, the sensor data items indicating that the mobile phone is in the standstill state, are continuously detected over the predetermined time period in the case where the front camera unit 8 had been started, it is highly possible that the mobile phone is placed on a desk, a charger, and so forth. In that case, therefore, it is highly possible that the front camera unit 8 had been uselessly started. Therefore, when sensor output data items indicating that the cabinet 21 of the mobile phone is in the standstill state are continuously detected from the acceleration sensor 12 over a predetermined time period, the control unit 14 performs control so that the front camera unit 8 which had been started is stopped. Accordingly, it becomes possible to prevent power from being wasted.

Next, when the front camera unit 8 is started, the control unit 14 advances the processing to step S3, and functions as a face-image detecting unit based on the face identification processing program stored in the memory 13. Then, the control unit 14 detects the user's face part shown in the image picked up through the front camera unit 8. If the faces of a plurality of users are shown in the image picked up through the front camera unit 8, the control unit 14 identifies the largest user's face alone.

Next, at step S4, the control unit 14 determines whether the above-described face identification processing is appropriately performed, and advances the processing to step S5 at the time when it is determined that the face identification processing is appropriately performed. At step S5, the control unit 14 temporarily stores the information about the position, the size, the angle, and so forth of the identified user's face, as initial face information, and advances the processing to step S6 or later.

At step S6 or later, the control unit 14 functions as a position change detecting unit based on the face identification processing program stored in the memory 13. Accordingly, the control unit 14 detects changes in the current position, the current size, and the current angle of the user's face, the changes being detected with reference to the position, the size, and the angle of the user's face indicated by the initial face information temporarily stored in the memory 13, based on the image picked up through the front camera unit 8.

For example, the control unit 14 detects the movement of the position of the user's face in the X-axis direction, the Y-axis direction, and the Z-axis direction by using, for example, a technology disclosed in Japanese Unexamined Patent Application Publication No. 2004-133637, the technology being achieved to match template data including information about the distribution of brightness values of a face with still image data.

More specifically, first, data of at least two types of images, the image data being obtained by reducing data of images (frame images=still images) picked up through the front camera unit 8, is prepared. Then, data of a group of face-brightness-distribution information templates, which is obtained when the user inclines his head, is prepared. Then, the templates are matched with the above-described images in sequence. The above-described templates are inclined toward each of the X axis, the Y axis, and the Z axis of a face three-dimensional rectangular coordinate system. The control unit 14 detects the inclination of the user's face shown in the still image by matching the reduced images with the templates.

Further, when the templates are matched with the reduced picked up image in sequence while being shifted on a two-dimensional plane and when a certain area is matched with the template, it means that the area corresponds to a position where the face image is shown. The area size can be obtained based on the reduction rate of real image data. Further, the rotation angle, the yaw, the pitch, and the roll around three orthogonal axes can be obtained based on the template used at that time.

After detecting the moving direction and the rotating angle of the user's face (the face angle) by performing the above-described face identification processing, the control unit 14 determines, at step S6, whether the current size of the user's face image is increased so that the size becomes larger than the size of the face image indicated by the initial face information since the user's face is moved in a direction toward the front camera unit 8 (the Z-axis direction). Then, if it is determined that the current size of the user's face image is increased, the control unit 14 advances the processing to step S11.

If the processing is advanced to step S11, the control unit 14 functions as a display control unit based on the display processing program stored in the memory 13. Accordingly, the control unit 14 performs redrawing processing so as to enlarge a standby image displayed on the display unit 5 so that the face image has the large size corresponding to the difference between the face size indicated by the initial face information temporarily stored in the memory 13 and the current face size. Then, the control unit 14 displays the enlarged standby image on the display unit 5 and advances the processing to step S10.

Next, if it is determined that the size of the user's face image is not increased at the above-described step S6, the control unit 14 advances the processing to step S7 so as to determine whether the current size of the user's face image is decreased so that the size becomes smaller than the size of the face image indicated by the initial face information since the user's face is brought in a direction away from the front camera unit 8 (the Z-axis direction). If it is determined that the size of the user's face image is decreased, the control unit 14 advances the processing to step S12.

When the processing is advanced to step S12, the control unit 14 functions as the display control unit based on the display processing program stored in the memory 13. Accordingly, the control unit 14 performs the redrawing processing so as to reduce the standby image displayed on the display unit 5 so that the face image has the small size corresponding to the difference between the face size indicated by the initial face information temporarily stored in the memory 13 and the current face size. Then, the control unit 14 displays the reduced standby image on the display unit 5 and advances the processing to step S10.

Figure 5:
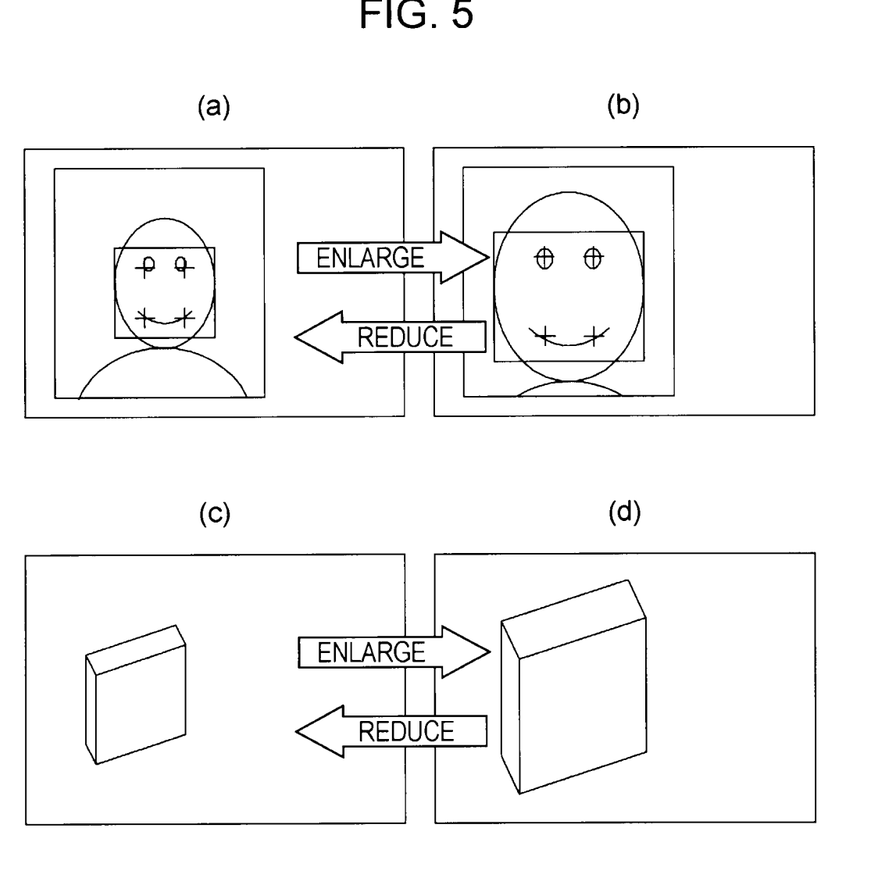
FIG. 5 is a diagram illustrating enlargement/reduction processing performed for a standby image based on the front camera image obtained through the above-described mobile phone.

Parts (a), (b), (c), and (d) of FIG. 5 show specific examples of the above-described enlargement/reduction processing. Each of Parts (a) and (b) of FIG. 5 shows the image of the user's face, the image being picked up through the front camera unit 8, and each of Parts (c) and (d) of FIG. 5 shows the standby image displayed on the display unit 5.

When the user brings his face near the front camera unit 8 as shown in Parts (a) and (b) of FIG. 5 in that order, the control unit 14 performs the redrawing processing so as to enlarge the standby image as shown in Parts (c) and (d) of FIG. 5 in that order, and displays the enlarged standby image on the display unit 5.

On the contrary, when the user brings his face away from the front camera unit 8 as shown in Parts (b) and (a) of FIG. 5 in that order, the control unit 14 performs the redrawing processing so as to reduce the standby image as shown in Parts (d) and (c) of FIG. 5 in that order, and displays the reduced standby image on the display unit 5.

Thus, when the user brings his face near and/or away from the front camera unit 8, the standby image displayed on the display unit 5 is enlarged and/or reduced for display.

Next, if it is determined that the size of the user's face image is not decreased at the above-described step S7, the control unit 14 advances the processing to step S8 so as to determine whether the current position of the user's face image is changed with reference to the face position indicated by the above-described initial face information (the initial face position) due to the user moving in the X-axis direction and/or the Y-axis direction including an upward direction, a downward direction, a left direction, a right direction, a slanting direction, and so forth without changing the distance between the user and the front camera unit 8. If it is determined that the position of the user's face image is changed, the control unit 14 advances the processing to step S13.

When the processing is advanced to step S13, the control unit 14 functions as the display control unit based on the display processing program stored in the memory 13. Accordingly, the control unit 14 detects the moving direction of the user's face based on the initial face position indicated by the initial face information temporarily stored in the memory 13 and the current face position, and performs the redrawing processing so as to generate a standby image by moving the standby image displayed on the display unit 5 in the direction corresponding to the moving direction of the user's face. Then, the control unit 14 displays the standby image on the display unit 5 and advances the processing to step S10.

Figure 6:
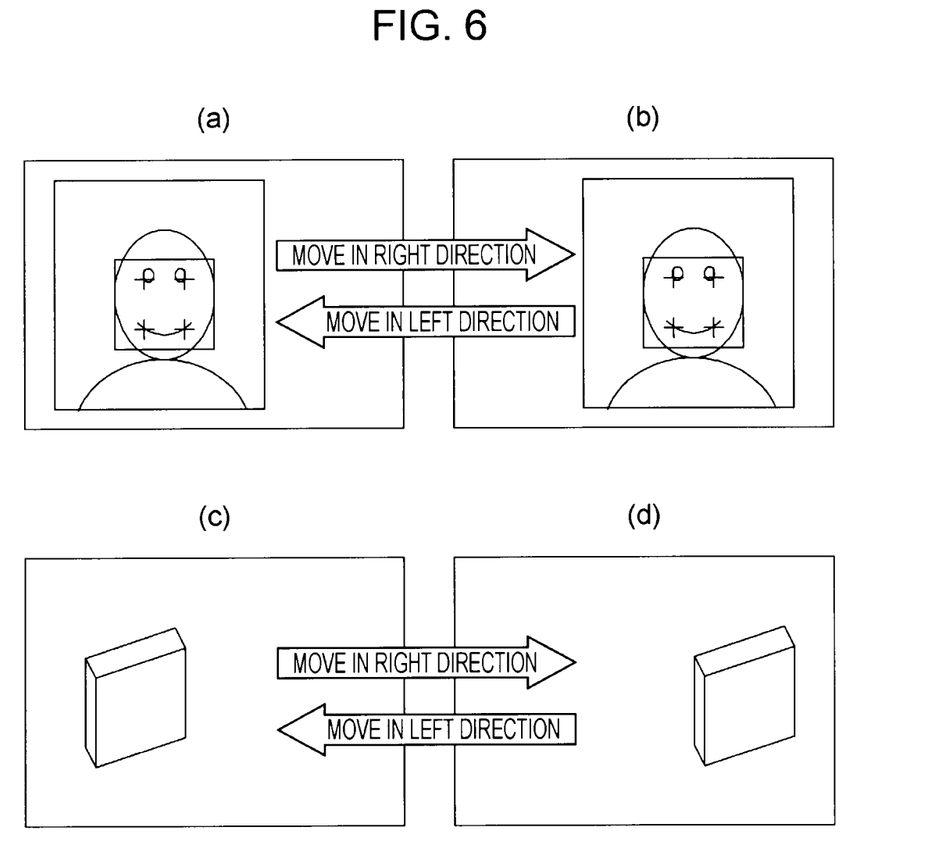
FIG. 6 is a diagram illustrating moving-and-display processing performed for the standby image based on the front camera image obtained through the above-described mobile phone.

Each of parts (a), (b), (c), and (d) of FIG. 6 shows a specific example of the above-described moving processing. Each of Parts (a) and (b) of FIG. 6 shows the image of the user's face, the image being picked up through the front camera unit 8, and each of Parts (c) and (d) of FIG. 6 shows the standby image displayed on the display unit 5.

When the user moves his face in a right direction, as shown in Parts (a) and (b) of FIG. 6 in that order, the control unit 14 performs the redrawing processing so as to obtain a standby image generated by moving the standby image displayed on the display unit 5 in a right direction as shown in Parts (c) and (d) of FIG. 6 in that order, and displays the obtained standby image on the display unit 5.

On the contrary, when the user moves his face in a left direction, as shown in Parts (b) and (a) of FIG. 6 in that order, the control unit 14 performs the redrawing processing so as to obtain a standby image generated by moving the standby image displayed on the display unit 5 in a left direction as shown in Parts (d) and (c) of FIG. 6 in that order, and displays the obtained standby image on the display unit 5.

According to Parts (a) to (d) of FIG. 6, the user exemplarily moves his face in the right direction and/or the left direction. However, even though the user moves his face in the upward direction, the downward direction, and the slanting direction, the control unit 14 performs the redrawing processing so as to obtain a standby image generated by moving the standby image in the direction corresponding to the moving direction of the user's face, and displays the obtained standby image on the display unit 5, as is the case with the above-described embodiment.

Accordingly, when the user moves his face in the vertical direction, the horizontal direction, and the slanting direction with reference to the front camera unit 8, the standby image displayed on the display unit 5 is moved in the vertical direction, the horizontal direction, and the slanting direction for display.

Next, if it is determined that the position of the user's face is not changed at the above-described step S8, the control unit 14 advances the processing to step S9 and determines whether the angle of the user's face is changed (=whether the face orientation is changed). If it is determined that the angle of the user's face is changed, the control unit 14 advances the processing to step S14.

When the processing is advanced to step S14, the control unit 14 functions as the display control unit based on the display processing program stored in the memory 13. Accordingly, the control unit 14 detects the difference between the face angle indicated by the initial face information temporarily stored in the memory 13 and the current face angle, and performs the redrawing processing so as to obtain a standby image viewed from the face angle corresponding to the detected difference. Then, the control unit 14 displays the standby image on the display unit 5 and advances the processing to step S10.

Figure 7A:
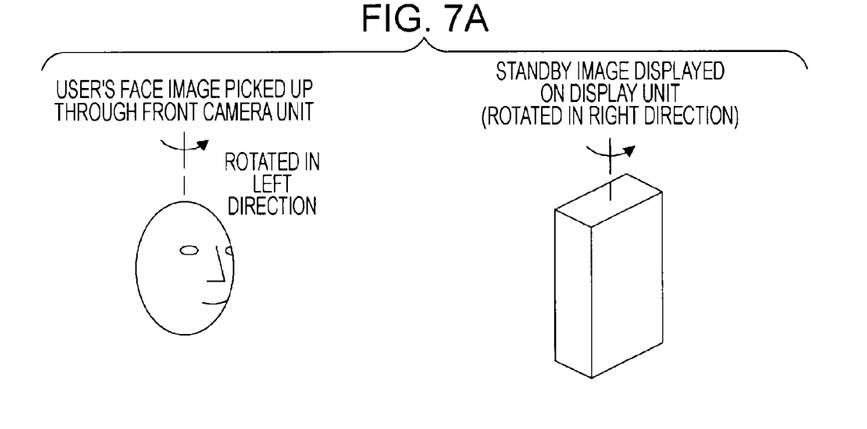
FIG. 7A is a diagram illustrating rotating-and-display processing performed for the standby image based on the front camera image obtained through the above-described mobile phone.
Figure 7B:
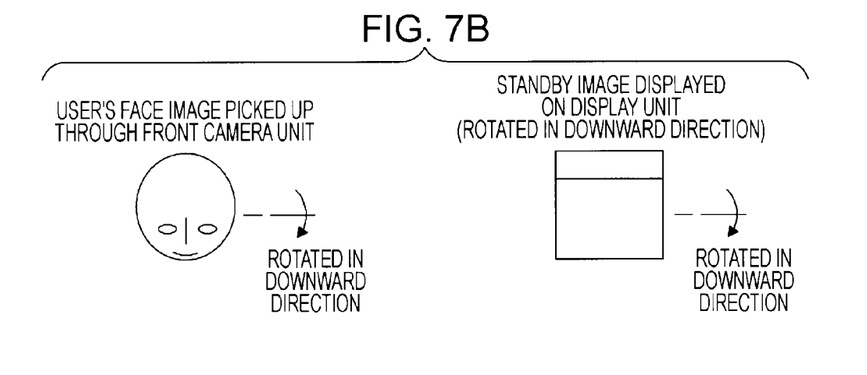
FIG. 7B is another diagram illustrating the rotating-and-display processing performed for the standby image based on the front camera image obtained through the above-described mobile phone.
Figure 7C:
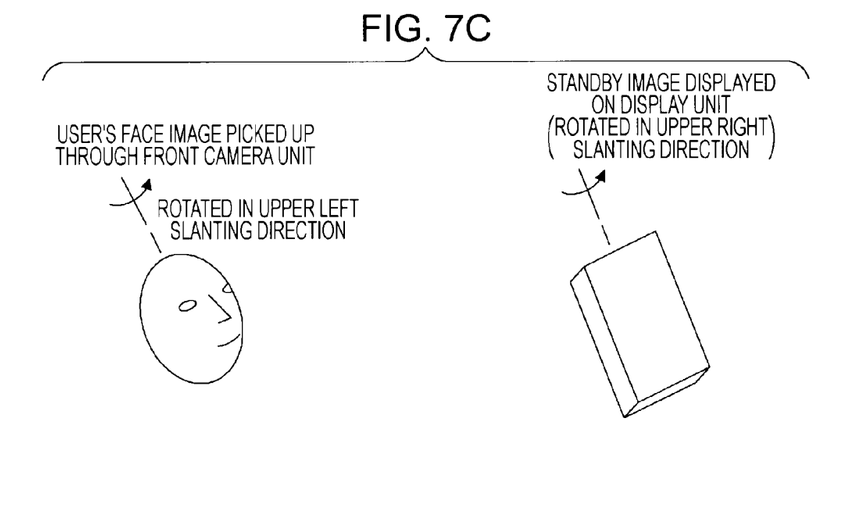
FIG. 7C is another diagram illustrating the rotating-and-display processing performed for the standby image based on the front camera image obtained through the above-described mobile phone.

Each of FIGS. 7A, 7B, and 7C shows an example of the display processing performed in accordance with the above-described face angle. FIG. 7A shows an example where the user rotates his face in a left direction. In that case, the control unit 14 performs the redrawing processing so as to obtain a standby image generated by rotating the standby image displayed on the display unit 5 in a right direction so that the redrawing processing is performed to obtain a standby image showing the object of the above-described standby image, the object being viewed from a left slanting direction, and displays the obtained standby image on the display unit 5.

FIG. 7B shows an example where the user rotates his face in a downward direction. In that case, the control unit 14 performs the redrawing processing so as to obtain a standby image generated by rotating the standby image displayed on the display unit 5 in the downward direction so that the redrawing processing is performed to obtain a standby image showing the object of the above-described standby image, the object being viewed from an upward slanting direction, and displays the obtained standby image on the display unit 5.

FIG. 7C shows an example where the user rotates his face in an upper left slanting direction. In that case, the control unit 14 performs the redrawing processing so as to obtain a standby image generated by rotating the standby image displayed on the display unit 5 in an upper right slanting direction so that the redrawing processing is performed to obtain a standby image showing the object of the above-described standby image, the object being viewed from a lower left slanting direction, and displays the obtained standby image on the display unit 5.

Accordingly, when the user moves his face in a vertical direction and a horizontal direction, or an upward slanting direction and a downward slanting direction, the redrawing processing is performed so that the standby image displayed on the display unit 5 is made into a standby image viewed from a direction in which the user's face is rotated, and the standby image is displayed on the display unit 5.

Next, when the processing is advanced to step S10 by performing the above-described redrawing processing, the control unit 14 monitors the operation state of the operation unit 6 so as to determine whether the user decides to terminate the application program provided to perform display processing for a display image based on the front camera image. Then, the above-described standby image is drawn repeatedly as the position of the user's face image is moved until the decision to terminate the application program is detected. At the time when the decision to terminate the application program is detected, the entire processing shown in the flowchart of FIG. 3 is finished.

Figure 8A:
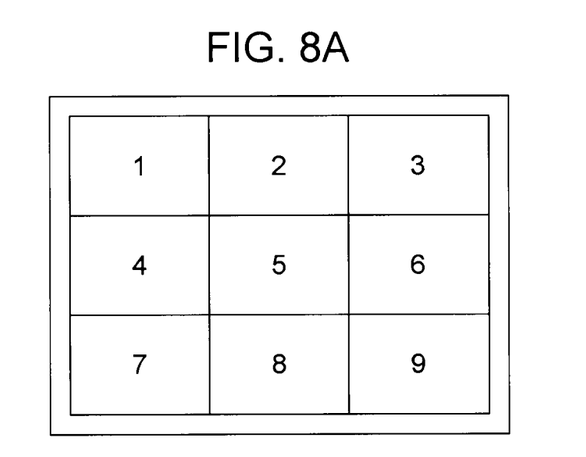
FIG. 8A is a diagram illustrating other display processing operations performed for the display image based on the front camera image in the above-described mobile phone.
Figure 8B:
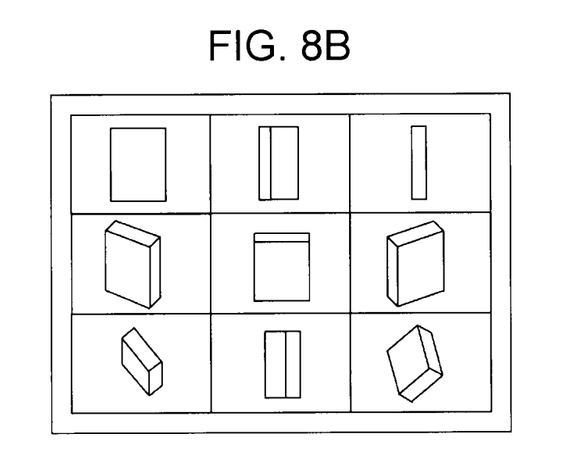
FIG. 8B is a diagram illustrating other display processing operations performed for the display image based on the front camera image in the above-described mobile phone.

In the above-described embodiment, a three-dimensional standby image is redrawn for display based on the moving position, the rotating direction, and so forth of the user's face. However, a plurality of the standby images corresponding to the moving position, the rotating direction, and so forth of the user's face may be prepared in advance as shown in FIGS. 8A and 8B. Further, the standby image corresponding to the moving position and/or the rotating direction of the actually detected user's face may be selected for display from among the plurality of standby images.

[Zoom Control Operations Performed During the Use of Main Camera Unit]

When the mobile phone according to the above-described embodiment performs imaging by using the main camera unit 9 provided with a zooming function, the control unit 14 displays an image which is currently picked up through the main camera unit 9 on the display unit 5 in real time. The user determines time while viewing the picked-up image displayed on the display unit 5 in real time, and presses and operates a shutter button at desired time so that an appropriate still image is picked up. When imaging is performed by using the above-described main camera unit 9, the control unit 14 performs zoom-up/zoom-down control for the zoom function of the main camera unit 9 based on the distance between the front camera unit 9 and the user's face.

Figure 9:
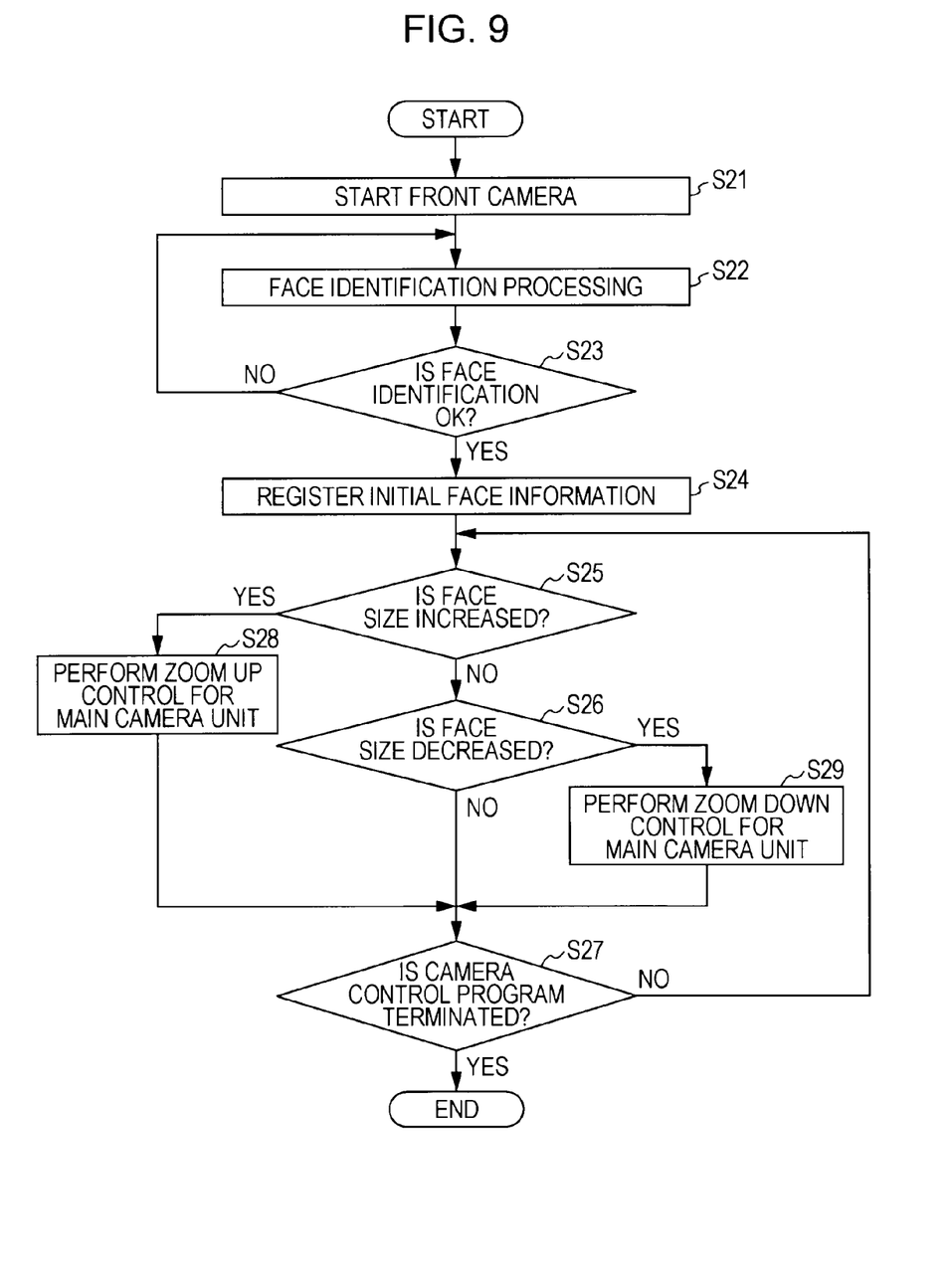
FIG. 9 is a flowchart showing the flow of zoom control operations performed in the above-described mobile phone during the use of a main camera unit.

FIG. 9 is a flowchart showing the flow of zoom control operations performed during the use of the above-described main camera unit 9. At the time when the user performs an operation to specify imaging performed by using the main camera unit 9, the control unit 14 performs control so that the main camera unit 9 is started. At the same time, the control unit 14 starts the processing shown in the flowchart of FIG. 9 based on the display processing program stored in the memory 13.

First, the control unit 14 starts the front camera unit 8 and advances the processing to step S21. At step S21, the control unit 14 functions as the face-image detecting unit based on the face identification processing program stored in the memory 13. Then, the control unit 14 detects the user's face part shown in the image picked up through the front camera unit 8. If the faces of a plurality of users are shown in the image picked up through the front camera unit 8, the control unit 14 identifies the largest user's face alone, as described above.

Next, at step S23, the control unit 14 determines whether the above-described face identification processing is appropriately performed, and advances the processing to step S24 at the time when it is determined that the face identification processing is appropriately performed. At step S24, the control unit 14 temporarily stores the initial face information including the information about the position, the size, the angle, and so forth of the identified user's face in the memory 13, and advances the processing to step S25.

At step S25, the control unit 14 functions as the position change detecting unit based on the face identification processing program stored in the memory 13. Accordingly, the control unit 14 determines whether the size of the user's face image picked up through the front camera unit 8 is increased with reference to the user's face size indicated by the initial face information temporarily stored in the memory 13 due to the user bringing his face near the front camera unit 8. If it is determined that the size of the user's face image is increased, the control unit 14 advances the processing to step S28.

If the processing is advanced to step S28, the control unit 14 performs the zoom-up control for the main camera unit 9 so as to achieve the enlargement rate corresponding to the difference between the face size indicated by the initial face information temporarily stored in the memory 13 and the current face size, and advances the processing to step S27. Accordingly, when the user brings his face near the front camera unit 8, the subject image picked up through the main camera unit 9 is enlarged and picked up.

Next, if it is determined that the size of the user's face image is not increased at the above-described step S25, the control unit 14 advances the processing to step S26 so as to determine whether the size of the user's face image picked up through the front camera unit 8 is decreased with reference to the size of the user's face image, the size being indicated by the initial face information temporarily stored in the memory 13, due to the user's face moving away from the front camera unit 8. If it is determined that the size of the user's face image is decreased, the control unit 14 advances the processing to step S29.

If the processing is advanced to step S29, the control unit 14 performs the zoom-down control for the main camera unit 9 so as to achieve the reduction rate corresponding to the difference between the face size indicated by the initial face information temporarily stored in the memory 13 and the current face size, and advances the processing to step S27. Accordingly, when the user brings his face away from the front camera unit 8, the subject image picked up through the main camera unit 9 is reduced and picked up.

Next, when the above-described zoom-up/zoom-down control is performed for the main camera unit 9 so that the processing is advanced to step S27, the control unit 14 determines whether the operation for specifying the termination of the imaging performed by using the main camera unit 9 is performed by the user by monitoring the operation state of the operation unit 6. Then, the control unit 14 performs the zoom-up/zoom-down control for the main camera unit 9 repeatedly in accordance with a change in the distance between the user's face and the front camera unit 8 until the operation performed to specify the termination of the imaging performed through the main camera unit 9 is detected. Then, the control unit 14 terminates the entire processing shown in the flowchart of FIG. 9 at the time when the operation performed to specify the termination of the imaging performed through the main camera unit 9 is detected.

Since the control unit 14 performs the zoom-up/zoom-down control for the main camera unit 9 based on the distance between the user's face and the front camera unit 8 as described above, the user can perform the zoom-up operation and/or the zoom-down operation for the main camera unit 9 by bringing his face near and/or away from the front camera unit 8. When performing the zoom-up operation and/or the zoom-down operation by operating buttons, a camera shake may occur due to the button operation. However, the mobile phone according to the above-described embodiment can reduce the occurrence of the above-described camera shake.

Advantages of Embodiments

As is clear from the above-described description, the mobile phone of the above-described embodiment picks up the image of the user's face through the self-photographing front camera unit 8 provided on the cabinet 21. The control unit 14 detects the movement of the position of the user's face and/or a change in the face angle based on the user's face image picked up through the front camera unit 8. Then, the control unit 14 subjects data of a predetermined image such as a standby image to processing including enlarging, reducing, moving horizontally and vertically, rotating, and so forth based on the moving position of the face and/or a change in the face angle, and displays the predetermined image data. Accordingly, the above-described standby image or the like displayed on the display unit 5 can be changed into a standby image viewed from the position of the user's face and displayed.

Further, the use of the front camera unit 8 provided on the cabinet 21 allows for achieving the above-described embodiments through a small-scale configuration without using a specifically designed sensor.

Further, since the zoom-up/zoom-down control is performed for the main camera unit 9 based on the distance between the front camera unit 8 and the user's face, the user can perform the zoom-up operation/the zoom-down operation for the main camera unit 9 by bringing his face near and/or away from the front camera unit 8. Therefore, the zoom-up operation/the zoom-down operation may not be performed by operating buttons, which prevents the camera shake from being caused by the button operation.

[Exemplary Modifications]

Although the mobile phone is used to implement the above-described embodiments of the present invention, a terminal device including a PHS phone, a PDA device, a mobile game machine, a note-type and/or desk top type personal computer apparatus, and so forth may be used. The use of any of the above-described devices allows for obtaining the same advantages.

The present application contains subject matter related to that disclosed in Japanese Priority Patent Application JP 2008-145044 filed in the Japan Patent Office on Jun. 2, 2008, the entire content of which is hereby incorporated by reference.

It should be understood by those skilled in the art that various modifications, combinations, sub-combinations and alterations may occur depending on design requirements and other factors without being limited to the above-described embodiments insofar as they are within the scope of the appended claims or the equivalents thereof.

What is claimed is:

1. A display processing device comprising:
    first camera circuitry provided on a first face of a housing of the display processing device;
    second camera circuitry provided on a second face of the housing of the display processing device opposite to the first face; and
    processing circuitry configured to:
        detect an image of a face that is largest in size among a plurality of faces, based on imaging data output by the first camera circuitry, wherein one of the plurality of faces corresponds to a user who holds the display processing device;
        detect a change in a size of the detected image of the face based on the imaging data output by the first camera circuitry;
        control the second camera circuitry to perform a zoom-up operation when a result of the detecting of the change in the size of the detected image of the face indicates that the size of the detected image of the face has increased;
        control the second camera circuitry to perform a zoom-down operation when a result of the detecting of the change in the size of the detected image of the face indicates that the size of the detected image of the face has decreased; and
        display an image based on imaging data output by the second camera circuitry on a display, and not display the image based on the imaging data output by the first camera circuitry on the display during the zoom-up and zoom-down operations, wherein
    the zoom-up operation and the zoom-down operation are performed when the display processing device is fully supported by the user.

2. The display processing device according to claim 1, wherein the processing circuitry is further configured to:
    display the image based on the imaging data output by the second camera circuitry on the display, and not display the image based on the imaging data output by the first camera circuitry on the display coincident with the detection of the change in the size of the detected image of the face based on the imaging data output by the first camera circuitry.

3. The display processing device according to claim 1, wherein the processing circuitry is further configured to:
    display the image based on the imaging data output by the second camera circuitry on the display, and not display the image based on the imaging data output by the first camera circuitry on the display while the first camera circuitry and the second camera circuitry output their respective imaging data.

4. A display processing method comprising:
    detecting an image of a face that is largest in size among a plurality of faces, based on imaging data output by first camera circuitry provided on a first face of a housing of a display processing device, wherein one of the plurality of faces corresponds to a user who holds the display processing device;
    detecting a change in a size of the detected image of the face based on the imaging data output by the first camera circuitry;
    controlling second camera circuitry provided on a second face of the housing of the display processing device opposite to the first face to perform a zoom-up operation when a result of the detecting of the change in the size of the detected image of the face indicates that the size of the detected image of the face has increased;
    controlling the second camera circuitry to perform a zoom-down operation when a result of the detecting of the change in the size of the detected image of the face indicates that the size of the detected image of the face has decreased; and
    displaying an image based on imaging data output by the second camera circuitry on a display, and not displaying the image based on the imaging data output by the first camera circuitry on the display during the zoom-up and zoom-down operations, wherein
    the zoom-up operation and the zoom-down operation are performed when the display processing device is fully supported by the user.

5. A non-transitory computer-readable medium including display processing program, which when executed by a display processing device, causes the display processing device to perform a method, the method comprising:
    detecting an image of a face that is largest in size among a plurality of faces, based on imaging data output by first camera circuitry provided on a first face of a housing of a display processing device, wherein one of the plurality of faces corresponds to a user who holds the display processing device;
    detecting a change in a size of the detected image of the face based on the imaging data output by the first camera circuitry;
    controlling second camera circuitry provided on a second face of the housing of the display processing device opposite to the first face to perform a zoom-up operation when a result of the detecting of the change in the size of the detected image of the face indicates that the size of the detected image of the face has increased;
    controlling the second camera circuitry to perform a zoom-down operation when a result of the detecting of the change in the size of the detected image of the face indicates that the size of the detected image of the face has decreased; and
    displaying an image based on imaging data output by the second camera circuitry on a display, and not displaying the image based on the imaging data output by the first camera circuitry on the display during the zoom-up and zoom-down operations, wherein
    the zoom-up operation and the zoom-down operation are performed when the display processing device is fully supported by the user.

6. A mobile terminal device comprising:
    first camera circuitry provided on a first face of a housing of the mobile terminal device;
    second camera circuitry provided on a second face of the housing of the mobile terminal device opposite to the first face; and
    processing circuitry configured to:
        detect an image of a face that is largest in size among a plurality of faces, based on imaging data output by the first camera circuitry, wherein one of the plurality of faces corresponds to a user who holds the mobile terminal device;
        detect a change in a size of the detected image of the face based on imaging data output by the first camera circuitry;
        control the second camera circuitry to perform a zoom-up operation when a result of the detecting of the change in the size of the detected image of the face indicates that the size of the detected image of the face has increased;
        control the second camera circuitry to perform a zoom-down operation when a result of the detecting of the change in the size of the detected image of the face indicates that the size of the detected image of the face has decreased; and
        display an image based on imaging data output by the second camera circuitry on a display, and not display the image based on the imaging data output by the first camera circuitry on the display during the zoom-up and zoom-down operations, wherein
    the zoom-up operation and the zoom-down operation are performed when the mobile terminal device is fully supported by the user.

* * * * *

UNITED STATES PATENT AND TRADEMARK OFFICE
CERTIFICATE OF CORRECTION

PATENT NO. : 9,152,229 B2  
APPLICATION NO. : 12/433308  
DATED : October 6, 2015  
INVENTOR(S) : Susumu Takatsuka et al.

Page 1 of 1

It is certified that error appears in the above-identified patent and that said Letters Patent is hereby corrected as shown below:

On the title page, Item (73), the Assignee's Information is incorrect. Item (73) should read:

--(73) Assignees: SONY CORPORATION, Tokyo (JP);
Sony Mobile Communications AB, Lund (SE)--

Signed and Sealed this
Twenty-eighth Day of June, 2016

Michelle K. Lee
*Director of the United States Patent and Trademark Office*